United States Patent

[11] 3,613,555

| [72] | Inventor | Murray Ogman<br>32 Annrae St., San Diego, Calif. 92123 |
|---|---|---|
| [21] | Appl. No. | 829,051 |
| [22] | Filed | May 29, 1969 |
| [45] | Patented | Oct. 19, 1971 |

[54] DISPOSABLE COOKING GREASE TRAP
5 Claims, 3 Drawing Figs.

[52] U.S. Cl. ............................................. 99/446
[51] Int. Cl. ............................................. A47j 27/00
[50] Field of Search ............................................. 99/444,
446, 447, 375, 400, 408, 425, 234, 171 LP; 34/95;
126/390, 39 M; 128/284, 286–287, 288, 290, 296;
206/0.5; 279/14; 161/109, 113–114, 160; 29/191,
191.4, 195

[56] References Cited
UNITED STATES PATENTS

| 2,149,713 | 3/1939 | Webber ..................... | 206/0.5 |
| 3,209,978 | 10/1965 | Dupuis ..................... | 229/14 |
| 3,127,828 | 4/1964 | Fine ..................... | 99/425 X |
| 3,453,949 | 7/1969 | Levin ..................... | 99/446 |

Primary Examiner—William I. Price
Assistant Examiner—Arthur O. Henderson
Attorney—Abraham Ogman ABSTRACT: The invention is directed to a disposable cooking grease trap designed to absorb grease and fat drippings from food being cooked. Two equal sized sheets of aluminum are joined at their periphery forming a compartment. One of the sheets is perforated to absorb drippings. A core of fluid absorbing material, such as paper toweling, is contained in the compartment to absorb and trap fluids passing through the perforations.

PATENTED OCT 19 1971  3,613,555

INVENTOR.
MURRAY OGMAN
BY
Abraham Ogman
ATTORNEY

DISPOSABLE COOKING GREASE TRAP Objects of the invention is to provide a disposable cooking grease trap which 1. includes means for greatly lessening the danger of a flareup;
2. includes means for absorbing grease and fat drippings in a relatively low-temperature receptacle;
3. includes means of lowering the temperature of grease and fat drippings; and
4. includes means for flavoring food by means of transpiration cooling.

In accordance with the invention a disposable cooking grease trap comprises a pair of noncombustible sheets joined at the peripheral edges forming a compartment, one of said sheets contains a plurality of perforations distributed over the surface. A core of fluid absorbing medium, with or without a vaporizable noncombustible and nontoxic material, is contained in the compartment.

The novel features that are considered characteristic of the invention are set forth in the appended claims; the invention itself, however, both as to its organization and method of operation, together with additional objects and advantages thereof, will best be understood from the following description of a specific embodiment when read in conjunction with the accompanying drawings, in which:

Figure 1:
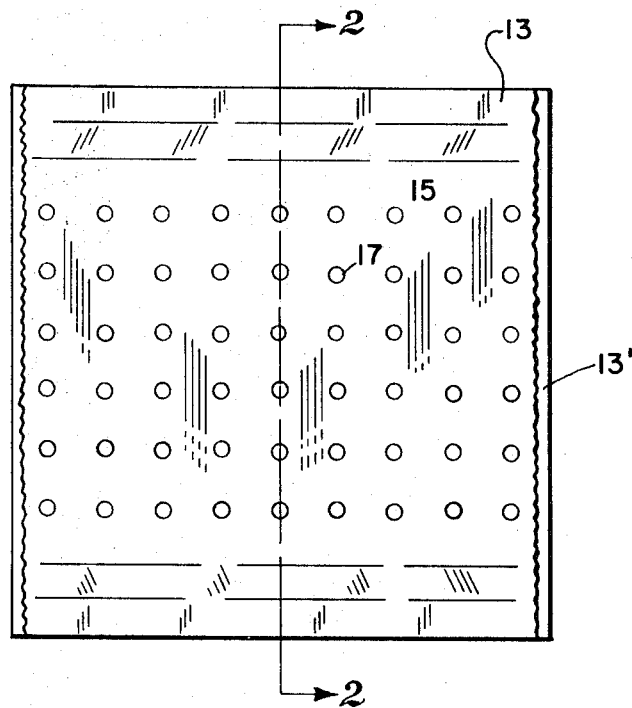
FIG. 1 is a top view of a cooking grease trap embodying the principles of the present invention.

Existing methods of cooking wherein grease is set free during the cooking process, either allows the grease to be exposed to the heat of the cooking process so as to create a potentially combustible hazard or to gravity drain the grease away from the direct-heat exposure. Additionally, devices in current use are not generally disposable largely because of the cost of investment. They frequently require mechanical separation of the grease for reuse of the separator. This invention provides reasonable protection against combustion of the grease and the convenience of grease disposal without cleaning and at throw-away prices.

The basic invention consists of two reflective metal sheets 11 and 12 sealed at the peripheral edges 13 and 13' to form a compartment 14 which contains a core 16 made from a material with absorbent properties for liquids. Materials such as a batting or a paper towel may be used.

The top-reflective metal sheet 12 is perforated with any suitable pattern to allow access to the core 16. The perforations 17 allow maximum direct exposure to the core material and to any absorbed fluid such as grease or an impregnant to the outside. The bottom-reflective sheet 11 is plain without any perforations and in normal handling is leakproof within its borders.

The invention functions as follows. The core material 16 can remain dry but it is preferable to saturate the core with water or a flavoring. The invention is then placed in a cooking environment or device with the perforated side up. The food to be cooked is placed over the perforated side of the invention. Upon application of heat used to cook the food, the food will shed its normally contained grease which will run off onto the perforated side of the invention and drain into the core 16 by gravity influence. The water contained in the core 16 and core material will initially and subsequently tend to cool the grease not drained into the core via conduction of the heat-laden grease heat through the reflective metal sheet into the water-soaked core 16. The heat transfer will reduce the susceptibility of the grease external to the invention from boiling, splattering and igniting into a combustible hazard. As continued heat is applied, the water in the core and core material will gradually heat up and turn into steam which will exit from the core via the perforations in the top-reflective metal sheet. The steaming water will be a continuous process that will maintain an essentially constant temperature of the grease flowing from the food. The grease flows into the core via the perforations to be absorbed and comingle with the remaining water in the core and core material and replace any evaporated water. In addition to the cooling action of the water on the grease, the top-reflective metal sheet 12 will also act as a heat barrier by its reflective properties of its exterior surface 15 so as to minimize any rapid loss of water and inhibit ignition of the grease retained in the core.

The bottom-reflective metal sheet 11 will serve as a heat barrier and also contain any grease and/or water that cannot be retained by the core material. Depending upon the length of time required for cooking, all the water in the core may be evaporated by the heat in which case the suppression of ignition of the grease in the core is inhibited by the top 12 and bottom 11 reflective metal sheets. Upon completion of cooking, the food is removed and the invention and the entrapped grease is permanently disposed of as a unit.

Figure 2:
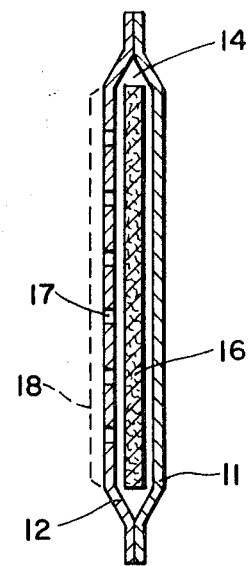
FIG. 2 is a sectional view taken along lines 2—2 in FIG. 1.
Figure 3:
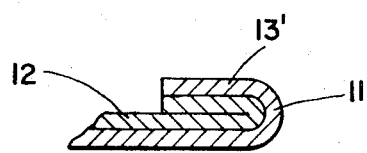
FIG. 3 is an enlarged section of the edge 13'.

The invention can be manufactured as a continuous sandwich design of predetermined widths that are sealed, such as 13 in FIG. 2, leaving the length to be cut at user's option such that the cut edges can be manually sealed (see 13' in FIG. 3) for attaining a total peripheral seal to retain the core material 16, core water and/or grease. Water in the core material can be prepackaged via an encapsulation device that would unseal upon application of heat (not shown). In the alternative the perforations may be sealed as at 18 in FIG. 2 to seal the compartment 14 and the contents thereof.

As another alternative, the invention can be manufactured as peripherally presealed units of predetermined sizes.

Heretofore the discussion was limited to the use of water to cool and prevent the grease from burning. Another benefit to be derived from the invention is the use of an evaporable flavoring or seasoning, which will, in addition to cooling, etc., penetrate into the food to continuously flavor or season the food during the cooking process.

A typical application of the invention would be to broil meats such as bacon and other high fat content foods.

The various features and advantages of the invention are thought to be clear from the foregoing description. Various other features and advantages not specifically enumerated will undoubtedly occur to those versed in the art, as likewise will many variations and modifications of the preferred embodiment illustrated, all of which may be achieved without departing from the spirit and scope of the invention as defined by the following claims:

I claim:

1. A disposable-cooking grease trap comprising a pair of noncombustible planar sheets sealed at the peripheral edges forming a compartment, one of said sheets containing a plurality of perforations distributed over the surface;

a core of a fluid absorbing medium contained within the compartment, said core being impregnated with a vaporizable, nontoxic and noncombustible material.

2. A disposable-cooking grease trap as defined in claim 1 wherein the core is impregnated with a noncombustible fluid and sealed in a heat-decomposable bag.

3. A disposable-cooking grease trap as defined in claim 1 wherein the core is paper toweling and the core is saturated with water.

4. A disposable-cooking grease trap as defined in claim 1 wherein the core is impregnated with vaporizable flavoring or seasoning.

5. A disposable-cooking grease trap as defined in claim 1 wherein the peripheral edges and the perforations are sealed with the perforations seal being removable, to unseal the contents of the compartment.